US008165361B2

(12) United States Patent
Li et al.

(10) Patent No.: US 8,165,361 B2
(45) Date of Patent: Apr. 24, 2012

(54) SYSTEM AND METHOD FOR IMAGE BASED MULTIPLE-MODALITY CARDIAC IMAGE ALIGNMENT

(75) Inventors: Shuo Li, E. London (CA); Prakash Mahesh, Hoffman Estates, IL (US); Dave Roeder, Toronto (CA); Richard Rankin, Denfield (CA)

(73) Assignee: General Electric Company, Schenectady, NY (US)

( * ) Notice: Subject to any disclaimer, the term of this patent is extended or adjusted under 35 U.S.C. 154(b) by 1137 days.

(21) Appl. No.: 12/013,939

(22) Filed: Jan. 14, 2008

(65) Prior Publication Data

US 2009/0180675 A1 Jul. 16, 2009

(51) Int. Cl.
*A61B 5/02* (2006.01)
(52) U.S. Cl. .......................... 382/128; 382/130; 382/131
(58) Field of Classification Search .................. 382/128, 382/130, 131, 154; 600/407, 425–429
See application file for complete search history.

(56) References Cited

U.S. PATENT DOCUMENTS

| 6,780,152 | B2* | 8/2004 | Ustuner et al. | 600/443 |
|---|---|---|---|---|
| 7,117,026 | B2* | 10/2006 | Shao et al. | 600/411 |
| 7,477,769 | B2* | 1/2009 | Jones et al. | 382/130 |
| 7,643,662 | B2* | 1/2010 | Gering | 382/128 |
| 2005/0080327 | A1* | 4/2005 | Jenkins et al. | 600/407 |
| 2005/0207538 | A1* | 9/2005 | Mollus et al. | 378/132 |
| 2005/0259864 | A1* | 11/2005 | Dickinson et al. | 382/154 |
| 2006/0058647 | A1* | 3/2006 | Strommer et al. | 600/434 |
| 2006/0285755 | A1* | 12/2006 | Hager et al. | 382/224 |
| 2008/0044104 | A1* | 2/2008 | Gering | 382/294 |
| 2008/0049991 | A1* | 2/2008 | Gering | 382/128 |
| 2008/0058656 | A1* | 3/2008 | Costello et al. | 600/508 |
| 2008/0221442 | A1* | 9/2008 | Tolkowsky et al. | 600/425 |
| 2008/0281205 | A1* | 11/2008 | Naghavi et al. | 600/458 |
| 2008/0319331 | A1* | 12/2008 | Zizzo et al. | 600/511 |
| 2009/0087122 | A1* | 4/2009 | Xu et al. | 382/277 |
| 2009/0097741 | A1* | 4/2009 | Xu et al. | 382/159 |
| 2009/0110294 | A1* | 4/2009 | Frielinghaus et al. | 382/209 |
| 2009/0175522 | A1* | 7/2009 | Li et al. | 382/130 |
| 2009/0231335 | A1* | 9/2009 | Von Berg et al. | 345/420 |

(Continued)

OTHER PUBLICATIONS

Zhang, Q.; Souvenir, R.; Pless, R.; "On Manifold Structure of Cardiac MRI Data: Application to Segmentation," Computer Vision and Pattern Recognition, 2006 IEEE Computer Society Conference on, vol. 1, no., pp. 1092-1098, Jun. 17-22, 2006.*

(Continued)

*Primary Examiner* — Robert Kim
*Assistant Examiner* — Wyatt Stoffa
(74) *Attorney, Agent, or Firm* — McAndrews, Held & Malloy, Ltd.; Armando Pastrana, Jr.

(57) ABSTRACT

Certain embodiments of the present invention provide a system and method for temporally aligning a plurality of cardiac image sequences. The method includes performing a locally linear embedding algorithm on a first set of cardiac image sequences and on a second set of cardiac image sequences. A graphical representation is created for the first set of cardiac image sequences and the second set of cardiac image sequences. A determination is made whether the first set of cardiac image sequences and the second set of cardiac image sequences were generated from a similar point of view. If a similar point of view is found, the first graphical representation and the second graphical representation are aligned using a minimization function. If a similar point of view is not found, the graphs are aligned with a template and then aligned with each other using the minimization function.

20 Claims, 5 Drawing Sheets

U.S. PATENT DOCUMENTS

| | | | | |
|---|---|---|---|---|
| 2009/0318392 | A1* | 12/2009 | Oresic et al. | 514/114 |
| 2009/0318802 | A1* | 12/2009 | Boyden et al. | 600/437 |
| 2010/0014736 | A1* | 1/2010 | Barschdorf et al. | 382/131 |
| 2010/0040270 | A1* | 2/2010 | Li et al. | 382/131 |
| 2010/0061609 | A1* | 3/2010 | Shinagawa et al. | 382/131 |
| 2010/0098306 | A1* | 4/2010 | Madabhushi et al. | 382/128 |
| 2010/0329529 | A1* | 12/2010 | Feldman et al. | 382/131 |
| 2011/0026798 | A1* | 2/2011 | Madabhushi et al. | 382/131 |
| 2011/0142320 | A1* | 6/2011 | Gupta et al. | 382/131 |

OTHER PUBLICATIONS

Elgammal, A.M., Lee, C.S.: Inferring 3D body6141745059 pose from silhouettes using activity manifold learning. IEEE Conf. CVPR 02 (2004) 681-688.*

Elgammal, A.M., Lee, C.S.: Separating style and content on a non-linear manifold. In: IEEE Conf. CVPR. (2004) 478-485.*

Roweis, S., Saul, L.: Nonlinear dimensionality reduction by locally linear embedding. Science 290(5500) (2000) 2323-2326.

Elgammal, A.M., Lee, C.S.: Separating style and content on a non-linear manifold. In: IEEE Conf. CVPR. (2004) 478-485.

Elgammal, A.M., Lee, C.S.: Inferring 3D body6141745059 pose from silhouettes using activity manifold learning. IEEE Conf. CVPR 02 (2004) 681-688.

Tangkuampien, T., Chin, T.J.: Locally linear embedding for markerless human motion capture using multiple cameras. In: International Conference on Digital Image Computing. (2005) 72.

* cited by examiner

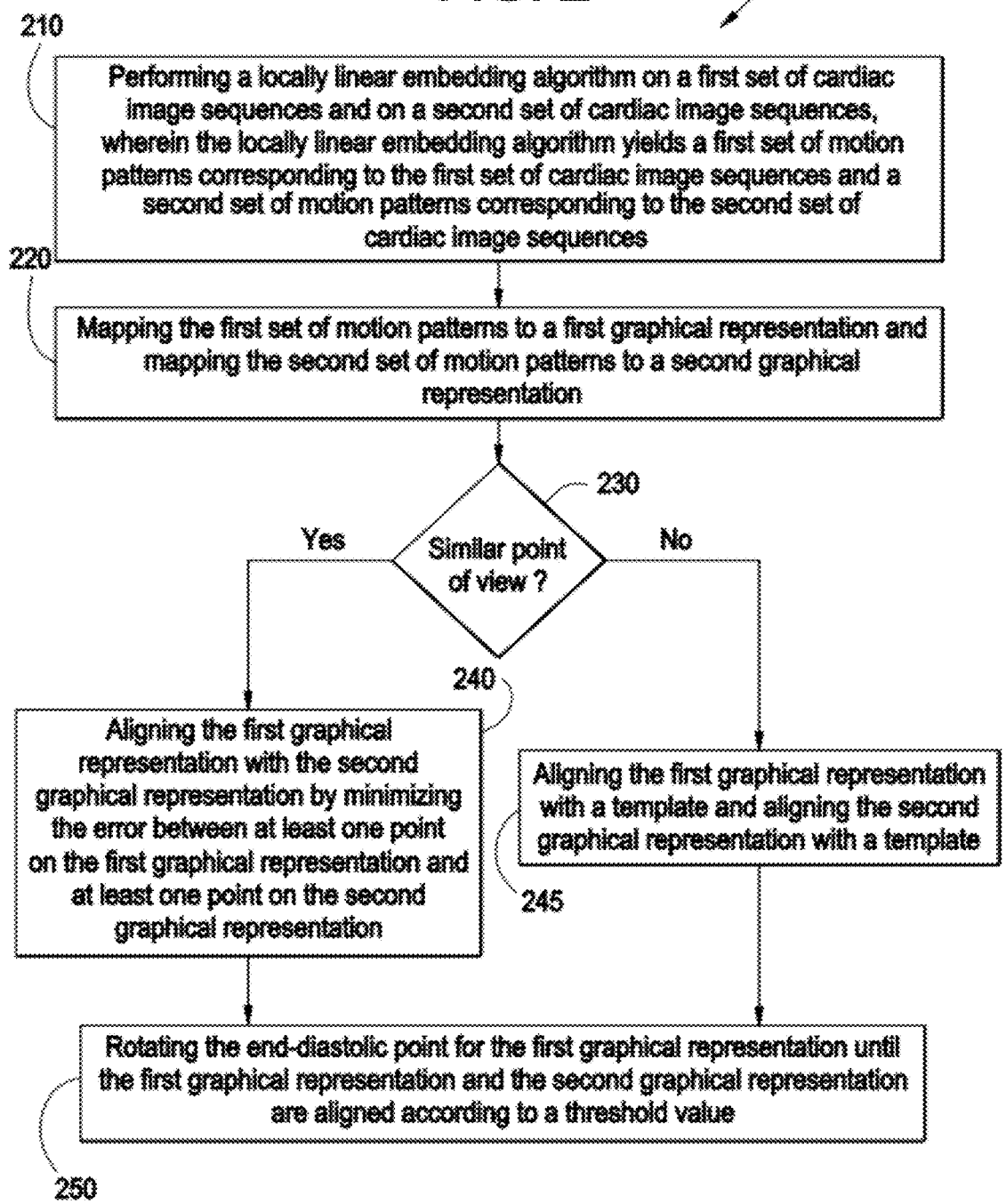

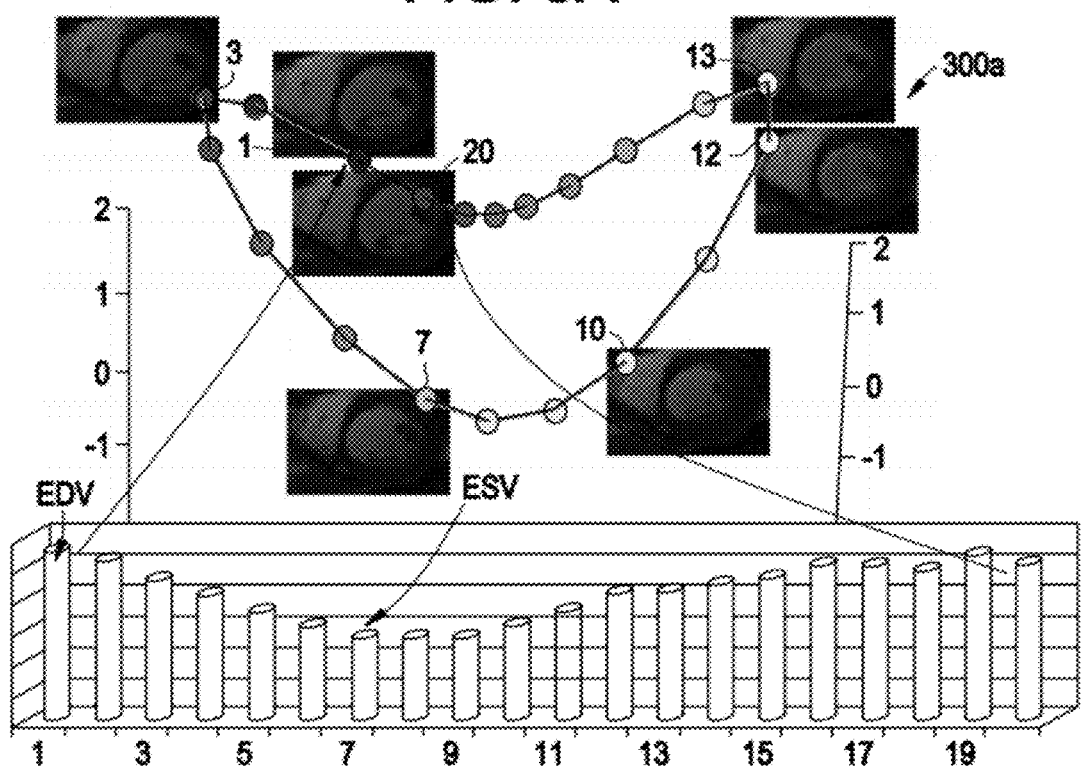

SYSTEM AND METHOD FOR IMAGE BASED MULTIPLE-MODALITY CARDIAC IMAGE ALIGNMENT

BACKGROUND OF THE INVENTION

The present invention generally relates to a system and method for improved cardiac image alignment. Particularly, the present invention relates to a system and method for temporally aligning a plurality of cardiac image sequences.

Medical diagnostic imaging systems encompass a variety of imaging modalities, such as x-ray systems, computerized tomography (CT) systems, ultrasound systems, electron beam tomography (EBT) systems, magnetic resonance (MR) systems, positron emission tomography (PET), single photon emission computed tomography (SPECT), and the like. Medical diagnostic imaging systems generate images of an object, such as a patient, for example, through exposure to an energy source, such as x-rays passing through a patient, for example. The generated images may be used for many purposes.

One example for using the images generated by medical diagnostic imaging systems is for cardiac imaging. Several cardiac imaging techniques permit physicians to take a closer look at the heart and vessels with minimal risk to the patient. Different modalities, such as CT, EBT, MR, PET or SPECT, provide complementary information about temporal structures and pathologies. Cardiac images of a patient may be acquired using the same modality at different times or using different modalities and different times. Dynamic cardiac images acquired at different times may be considered five dimensional, for example dynamic 3D images may be considered four dimensional. Four dimensional images that are acquired at multiple times may be considered five dimensional. Typical examples may include dynamic cardiac CT scans and/or gated cardiac MRI scans acquired at 3-monthly intervals. Another example may include dynamic cell growth and shape change examinations in weekly intervals.

The combination of information from multiple cardiac image modalities, for example MRI and CT, is of increasing interest in the medical community for physiologic understanding and diagnostic purposes. It is difficult, however, to fuse information from multiple dynamic clinical images, especially when the clinical images are captured at different time points, with different modalities and with different set-ups.

For example, because of the rapid progresses in imaging techniques, the amount of image data involved in a comprehensive patient study is massive. Gated cardiac MRI or CT sequences recorded from a complete cardiac cycle, for example, comprise 1500-5000 two dimensional images and pose challenges to archiving, storage and data transfer. Alignment of inter-modality and/or intra-modality images is also challenging because images are captured in various orientations and positions and at different scales. Typically, it is a time consuming process to manually align the data. Generally, gating techniques used in the clinical environment, coupled with noise and error, are not consistent with each other. For example, peripheral-gated images are usually delayed with respect to precordial-gated images. Moreover, gating information is usually not available when these images are inspected. Also, different temporal resolutions are used for different modalities and different diseases. These, among other problems, present a need for improved cardiac image alignment.

SUMMARY OF THE INVENTION

Certain embodiments of the present invention provide a method for temporally aligning a plurality of cardiac image sequences. The method comprises performing a locally linear embedding algorithm on a first set of cardiac image sequences and on a second set of cardiac image sequences. The locally linear embedding algorithm yields a first set of motion patterns corresponding to the first set of cardiac image sequences and a second set of motion patterns corresponding to the second set of cardiac image sequences. The method also comprises mapping the first set of motion patterns to a first graphical representation and mapping the second set of motion patterns to a second graphical representation. The method also comprises determining whether the first set of cardiac image sequences and the second set of cardiac image sequences were generated from a similar point of view. If the first set of cardiac image sequences and the second set of cardiac image sequences were generated from a similar point of view, the first graphical representation is aligned with the second graphical representation by minimizing the error between at least one point on the first graphical representation and at least one point on the second graphical representation. The graphical representations are further aligned by rotating the end-diastolic point for the first graphical representation until the first graphical representation and the second graphical representation are aligned according to a threshold value If the first set of cardiac image sequences and the second set of cardiac image sequences were not generated from a similar point of view, the first graphical representation is aligned with a first template. The first template corresponds to the point of view of the first graphical representation. The second graphical representation is aligned with a template, wherein the second template corresponds to the point of view of the second graphical representation. The first graphical representation is aligned with the second graphical representation by rotating the end-diastolic point for the first graphical representation until the first graphical representation and the second graphical representation are aligned according to a threshold value.

Certain embodiments of the present invention provide a system for temporally aligning a plurality of cardiac image sequences. The system comprises a processor and a memory. The memory is in communication with the processor. The memory includes program code executable by the processor for performing a locally linear embedding algorithm on a first set of cardiac image sequences and on a second set of cardiac image sequences. The locally linear embedding algorithm yields a first set of motion patterns corresponding to the first set of cardiac image sequences and a second set of motion patterns corresponding to the second set of cardiac image sequences. The program executable code maps the first set of motion patterns to a first graphical representation and maps the second set of motion patterns to a second graphical representation. The program executable code determines whether the first set of cardiac image sequences and the second set of cardiac image sequences were generated from a similar point of view. If the first set of cardiac image sequences and the second set of cardiac image sequences were generated from a similar point of view, the first graphical representation is aligned with the second graphical representation by minimizing the error between at least one point on the first graphical representation and at least one point on the second graphical representation. The graphical representations are further aligned by rotating the end-diastolic point for the first graphical representation until the first graphical representation and the second graphical representation are aligned according to a threshold value.

If the first set of cardiac image sequences and the second set of cardiac image sequences were not generated from a similar point of view, the first graphical representation is aligned with a first template, wherein the first template corresponds to the point of view of the first graphical representation. The second graphical representation is aligned with a second template, wherein the second template corresponds to the point of view of the second graphical representation. The first graphical representation is aligned with the second graphical representation by rotating the end-diastolic point for the first graphical representation until the first graphical representation and the second graphical representation are aligned according to a threshold value.

Certain embodiments of the present invention provide for a computer-readable storage medium including a set of instructions for a computer. The set of instructions comprise a locally linear embedding routine for performing a locally linear embedding algorithm on a first set of cardiac image sequences and on a second set of cardiac image sequences. The locally linear embedding algorithm yields a first set of motion patterns corresponding to the first set of cardiac image sequences and a second set of motion patterns corresponding to the second set of cardiac image sequences. The set of instructions includes a mapping routine for mapping the first set of motion patterns to a first graphical representation and mapping the second set of motion patterns to a second graphical representation. The set of instructions also includes a determining routine for determining whether the first set of cardiac image sequences and the second set of cardiac image sequences were generated from a similar point of view. If the first set of cardiac image sequences and the second set of cardiac image sequences were generated from a similar point of view, the first graphical representation is aligned with the second graphical representation by minimizing the error between at least one point on the first graphical representation and at least one point on the second graphical representation. The graphical representations are further aligned by rotating the end-diastolic point for the first graphical representation until the first graphical representation and the second graphical representation are aligned according to a threshold value.

If the first set of cardiac image sequences and the second set of cardiac image sequences were not generated from a similar point of view, the first graphical representation is aligned with a first template. The first template corresponds to the point of view of the first graphical representation and the second graphical representation is aligned with a second template, wherein the second template corresponds to the point of view of the second graphical representation. The first graphical representation is aligned with the second graphical representation by rotating the end-diastolic point for the first graphical representation until the first graphical representation and the second graphical representation are aligned according to a threshold value.

BRIEF DESCRIPTION OF THE DRAWINGS

FIG. 2 illustrates a method that may be used in accordance with an embodiment of the present invention.

FIG. 3(a) illustrates a graphical representation of a gated MRI sequence short axis view and left volume histogram that may be used in accordance with an embodiment of the present invention.

DETAILED DESCRIPTION OF THE INVENTION

Figure 1:
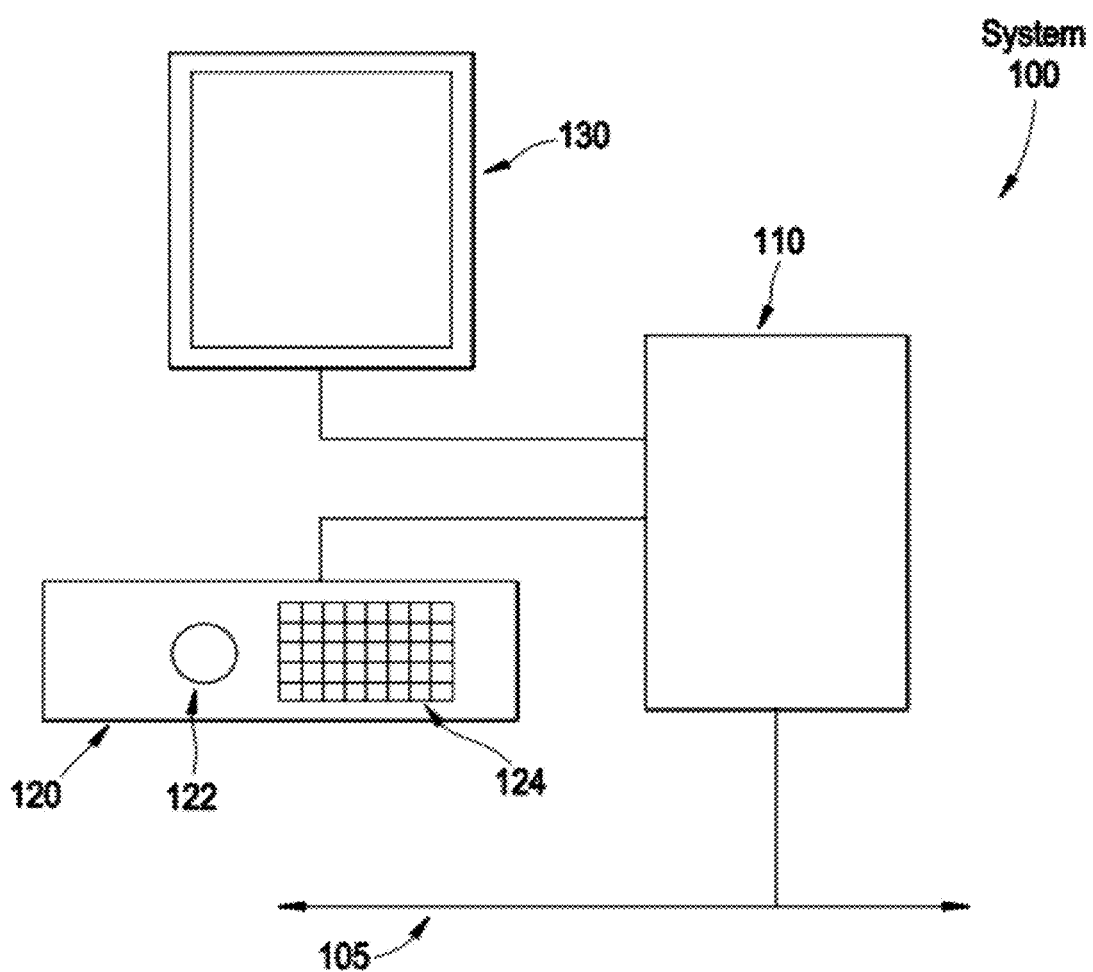
FIG. 1 illustrates an example of a system that may be used in accordance with an embodiment of the present invention.

FIG. 1 illustrates a system 100 for manipulating and viewing medical images. The system 100 includes a computer unit 110. The computer unit 110 may be any equipment or software that permits electronic medical images, such as ultrasound, CT, EBT, MR, PET, or SPECT for example, to be electronically acquired, stored, or transmitted for viewing and operation. The computer unit 110 may have at least one processor and memory. The computer unit may receive input from a user. The computer unit 110 may be connected to other devices as part of an electronic network. In FIG. 1, the connection to the network is represented by line 105. The computer unit 110 may be connected to network 105 physically, by a wire, or through a wireless medium. In an embodiment, the computer unit 110 may be, or may be part of, a picture archival communication system (PACS).

The system 100 also includes an input unit 120. The input unit 120 may be a console having a track ball 122 and keyboard 124. Other input devices may be used to receive input from a user as part of the input unit 120. For example a microphone may be used to receive verbal input from a user. The system 100 also includes at least one display unit 130. The display unit 130 may be a typical computer display unit. The display unit 130 may be in electrical communication with the computer unit 110 and input unit 120. In an embodiment, the display unit 130 may represent multiple display units or display regions of a screen. Accordingly, any number of display units may be utilized in accordance with the present invention.

In an embodiment, the system 100 is a PACS with display unit 130 representing the display unit of PACS. The computer unit 110 may represent equipment and components of a PACS system other than the display unit. The computer unit 110 and display unit 130 may be separate units or be part of a single unit. In the case of separate units, the display unit 130 may be in electrical communication with the computer unit 110. The components of the system 100 may be single units, separate units, may be integrated in various forms, and may be implemented in hardware and/or in software.

In an embodiment, the computer unit 110 may be connected to a medical diagnostic imaging system by the network 105. In an embodiment, the medical diagnostic imaging system may include, for example, a computerized tomography (CT) system, an ultrasound system, an electron beam tomography (EBT) system, a magnetic resonance (MR) system, a positron emission tomography system (PET), or a single photon emission computed tomography system (SPECT).

In an embodiment, the computer system 100 may include computer software for temporally aligning a plurality of cardiac image sequences. Temporally aligning a plurality of cardiac image sequences may include aligning a plurality of image sequences according to a point in time during the cardiac cycle. The images may have been acquired by the same modality and have similar points of view or different modalities and may have different points of view. The computer unit 110 may include a processor for processing instructions and a memory that is in communication with the processor. In an embodiment, the memory includes program code executable by the processor for performing a locally linear embedding algorithm on a first set of cardiac image sequences and on a second set of cardiac image sequences.

The locally linear embedding algorithm yields a first set of motion patterns corresponding to the first set of cardiac image sequences and a second set of motion patterns corresponding to the second set of cardiac image sequences. The computer software uses the motion patterns to map the first set of motion patterns to a first graphical representation and map the second set of motion patterns to a second graphical representation. The first graphical representation may then be aligned with the second graphical representation by minimizing the error between at least one point on the first graphical representation and at least one point on the second graphical representation.

The locally linear embedding algorithm minimizes the need to estimate pairwise distances between widely separated data points and recovers global nonlinear structure from locally linear fits. The locally linear embedding algorithm assumes that the manifold is linear when viewed locally. In an embodiment, the locally linear embedding algorithm may be described as follows. Suppose a dynamic data set consists of N images, which can be reshaped into N real-valued vectors $\vec{A}_i$ at dimensionality D, well sampled from some underlying manifold. The reconstruction error ($\epsilon^R(\omega)$) is defined as:

$$\varepsilon^R(\omega) = \sum_i |\vec{A}_i - \sum_j \omega_{ij}\vec{A}_j|^2. \qquad \text{Eq. (1)}$$

To compute the weights $\omega_{ij}$, locally linear embedding algorithm minimizes the cost function subject to two constraints: $\omega_{ij}=0$, if $\vec{A}_j$ is not one of neighbors of $\vec{A}_i$ and rows of the weight matrix sum to one: $\Sigma \omega_{ij}=1$. With the known $\omega_{ij}$, the high dimensional observation $\vec{A}_i$ is mapped to a d-dimensional (d<<D) vector $\vec{B}_i$, while representing global internal coordinates on the manifold, by minimizing the embedding cost function ($\epsilon^d(\omega)$)) subject to constraint $B_i B_i^T$:

$$\varepsilon^d(\omega) = \sum_i |\vec{B}_i - \sum_j \omega_{ij}\vec{B}_j|^2. \qquad \text{Eq. (2)}$$

The use of locally linear embedding is more fully described in Roweis, S., Saul, L.: Nonlinear dimensionality reduction by locally linear embedding. Science 290(5500) (2000) 2323-2326, the fall text of which is herein incorporated by reference.

In an embodiment, the output of the locally linear embedding algorithm yields motion patterns. The computer software may map the motion patterns to a graphical representation. For example, the points of the motion patterns may be transferred into a graph (G=(V,E) where V is a set of vertices which is defined as $B_i$ and E is a set of edges that connect $B_i$ with its temporal neighbors. With a graphical representation, $B_i$ may be visualized in both 2D and 3D. A set of vertices having a start vertex $V_b$ may be defined where $V_b$ corresponds to the end-diastolic. In an embodiment having a first set of cardiac image sequences and a second set of cardiac image sequences, the locally linear embedding algorithm yields a first set of motion patterns corresponding to the first set of cardiac image sequences and a second set of motion patterns corresponding to the second set of cardiac image sequences. The computer software uses the motion patterns to map the first set of motion patterns to a first graphical representation and map the second set of motion patterns to a second graphical representation.

In an embodiment, the computer software may determine whether the first set of cardiac image sequences and the second set of cardiac image sequences were generated from a similar point of view. If the first set of cardiac image sequences and the second set of cardiac image sequences were generated from a similar point of view, the computer software aligns the first graphical representation with the second graphical representation by minimizing the error between at least one point on the first graphical representation and at least one point on the second graphical representation.

For example, the computer software may align the first graphical representation and the second graphical representation. The alignment may be modeled as a graph matching. For example, given two graphs $G_M=(V_M, E_M)$ and $G_D=(V_D, E_D)$, the alignment problem is to find a one-to-one mapping f: $V_D \to V_M$ such that (u, v)$\in E_D$, iff (f(u), f(v))$\in E_D$. With the graph representation, the alignment is transformed into a minimization problem:

$$E=\Sigma\|V_M|-|V_D\|+\Sigma\|E_M|-|E_D\|. \qquad \text{Eq. (3)}$$

In this implementation, the similarity matrix of vertices may include gradients and gaussian curvatures, and the similarity matrix of edges is length.

In an embodiment, the first graphical representation and the second graphical representation may be further aligned by rotating the end-diastolic point for the first graphical representation until the first graphical representation and the second graphical representation are aligned according to a threshold value. The threshold value may be some value indicating the first graphical representation and the second graphical representation are substantially aligned.

If the first set of cardiac image sequences and the second set of cardiac image sequences were not generated from a similar point of view, the computer software utilizes one or more templates according to the point of view of the first and second graphical representations. For example, the first graphical representation is aligned with a first template. The first template may be selected from a plurality of templates according to the point of view or modality of the first graphical representation. In an embodiment, the first and second graphical representations are aligned separately with a view dependent template. The view dependent template is pre-created. In an embodiment, the template is created based on a supervised learning of locally linear embedding on several sequences. For example, several representative sequences may be manually aligned and the $B_i$ for the model is obtained by averaging the $B_i$ from the learning sequence. The second graphical representation may be aligned with a second template. The second template may be selected according to the point of view of the second graphical representation.

Once the first graphical representation and the second graphical representation are aligned with the respective templates, the first graphical representation may be aligned with the second graphical representation. The alignment may be performed by rotating the end-diastolic point for the first graphical representation until the first graphical representation and the second graphical representation are aligned according to a threshold value. The threshold value may be some value indicating the first graphical representation and the second graphical representation are substantially aligned.

FIG. 2 illustrates a method 200 for temporally aligning a plurality of cardiac image sequences that may be used in accordance with an embodiment of the present invention. Temporally aligning a plurality of cardiac image sequences may include aligning a plurality of image sequences according to a point in time during the cardiac cycle. The images may have been acquired by the same modality and have similar points of view or different modalities and may have different points of view. At step 210, a locally linear embedding algorithm is performed on a first set of cardiac image sequences and on a second set of cardiac image sequences. As described above in an embodiment, the locally linear embedding algorithm may be described as follows. Suppose a dynamic data set consists of N images, which can be reshaped into N real-valued vectors $A_i$ at dimensionality D, well sampled from some underlying manifold. The reconstruction error ($\epsilon^R(\omega)$)) is defined as:

$$\varepsilon^R(\omega) = \sum_i \left| \vec{A}_i - \sum_j \omega_{ij} \vec{A}_j \right|^2. \qquad \text{Eq. (1)}$$

To compute the weights $\omega_{ij}$, locally linear embedding algorithm minimizes the cost function subject to two constraints: $\omega_{ij}=0$, if $\vec{A}_j$ is not one of neighbors of $\vec{A}_i$, and rows of the weight matrix sum to one: $\Sigma\ \omega_{ij}=1$. With the known $\omega_{ij}$, the high dimensional observation $A_i$ is mapped to a d-dimensional (d<<D) vector $B_i$, while representing global internal coordinates on the manifold, by minimizing the embedding cost function ($\epsilon^d(\omega)$)) subject to constraint $B_i B_i^T$:

$$\varepsilon^d(\omega) = \sum_i \left| \vec{B}_i - \sum_j \omega_{ij} \vec{B}_j \right|^2. \qquad \text{Eq. (2)}$$

The use of locally linear embedding is more fully described in Roweis, S., Saul, L.: Nonlinear dimensionality reduction by locally linear embedding. Science 290(5500) (2000) 2323-2326, the fall text of which is herein incorporated by reference. In an embodiment, the locally linear embedding algorithm yields a first set of motion patterns corresponding to a first set of cardiac image sequences and a second set of motion patterns corresponding to a second set of cardiac image sequences.

At step 220, the first set of motion patterns are mapped to a first graphical representation and the second set of motion patterns are mapped to a second graphical representation. For example, the points of the motion patterns may be transferred into a graph (G=(V,E) where V is a set of vertices which is defined as $B_i$ and E is a set of edges that connect $B_i$ with its temporal neighbors. With a graphical representation, $B_i$ may be visualized in both 2D and 3D. A set of vertices having a start vertex $V_b$ may be defined where $V_b$ corresponds to the end-diastolic.

A decision is made at step 230 to determine how to align the first and second graphical representations. At step 230, in an embodiment, the point of view for the first set of cardiac image sequences and the second set of cardiac image sequences is determined. Alternatively, the modality for the first set of cardiac image sequences and the second set of cardiac image sequences is determined. In an embodiment, if the points of view are similar, step 240 and 250 are performed. If the points of view are different, the steps 245 and 250 are performed.

If at step 230, it is determined that that the first and second graphical representations were generated from a similar point of view, step 240 is performed. At step 240, the first graphical representation is aligned with the second graphical representation by minimizing the error between at least one point on the first graphical representation and at least one point on the second graphical representation.

For example, the first graphical representation may be aligned with the second graphical representation. The alignment may be modeled as a graph matching. For example, given two graphs $G_M=(V_M, E_M)$ and $G_D=(V_D,E_D)$, the alignment problem is to find a one-to-one mapping f: $V_D\ V_M$ such that $(u_\rightarrow, v) \in E_D$, iff (f(u), f(v))$\in E_D$. With the graph representation, the alignment is transformed into a minimization problem:

$$E=\Sigma\|V_M|-|V_D\|+\Sigma\|E_M|-|E_D\|. \qquad \text{Eq. (3)}$$

In this implementation, the similarity matrix of vertices may include gradients and gaussian curvatures, and the similarity matrix of edges is length.

At step 250, the first graphical representation and the second graphical representation may be further aligned by rotating the end-diastolic point for the first graphical representation until the first graphical representation and the second graphical representation are aligned according to a threshold value. The threshold value may be some value indicating the first graphical representation and the second graphical representation are substantially aligned.

If the first set of cardiac image sequences and the second set of cardiac image sequences were not generated from a similar point of view, step 245 may be performed. The first and second graphical representations may be aligned with the first and second template, respectively. For example, the first graphical representation is aligned with a first template. The first template may be selected from a plurality of templates according to the point of view or modality of the first graphical representation. In an embodiment, the template is created based on a supervised learning of locally linear embedding on several sequences. In an embodiment, the first and second graphical representations are aligned separately with a view dependent template. The view dependent template is pre-created. For example, several representative sequences may be manually aligned and the $B_i$ for the model is obtained by averaging the $B_i$ from the learning sequence. The second graphical representation may be aligned with a second template. The second template may be selected according to the point of view of the second graphical representation. In an embodiment, the templates correspond to at least one of the following: computerized tomography, magnetic resonance, electron beam tomography, positron emission tomography, or single photon emission computed tomography.

Once the first graphical representation and the second graphical representation are aligned with the respective templates, the first graphical representation may be aligned with the second graphical representation at step 250. At step 250, the first graphical representation and the second graphical representation may be further aligned by rotating the end-diastolic point for the first graphical representation until the first graphical representation and the second graphical representation are aligned according to a threshold value. The threshold value may be some value indicating the first graphical representation and the second graphical representation are substantially aligned.

Figure 3B:
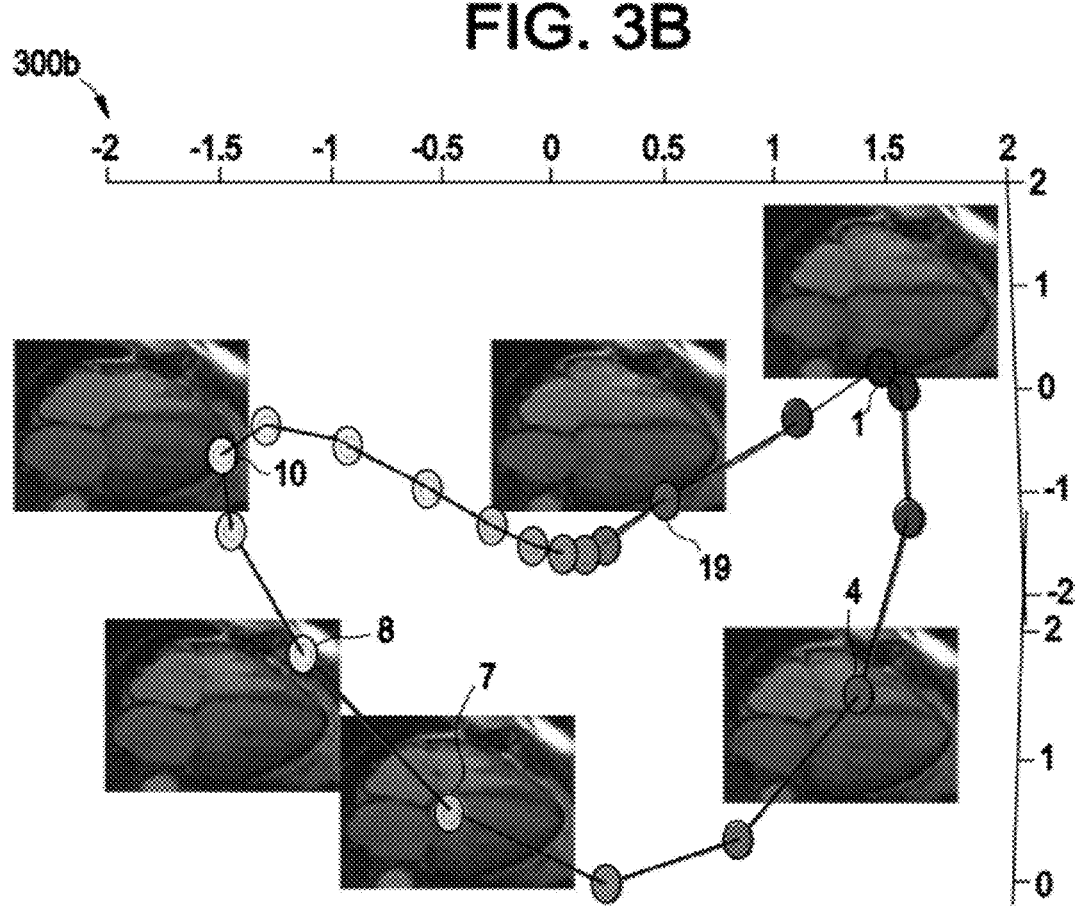
FIG. 3(b) illustrates a graphical representation of a gated MRI cardiac sequence long axis view that may be used in accordance with an embodiment of the present invention.

FIGS. 3(*a*) and 3(*b*) illustrate respective graphics 300(*a*) and 300(*b*) in accordance with an embodiment of the present invention. FIG. 3(*a*) illustrates an example of a graphical representation of a gated MRI sequence short axis view and left volume histogram that may be used in accordance with an embodiment of the present invention. FIG. 3(*b*) illustrates a graphical representation of a gated MRI cardiac sequence long axis view that may be used in accordance with an embodiment of the present invention. As illustrated in FIGS. 3(a) and 3(b), EDV means ventricular end-diastolic volume and ESV means the end-systolic volume.

As illustrated in FIGS. 3(a) and 3(b), for example, since the cardiac movement is periodic, the vertices form a closed loop. FIGS. 3(a) and 3(b) have two similar half loops that correspond to the contraction and relaxation of the heart. Each volume is indexed with respect to its order in the sequence. As shown in the FIG. 3(a), image 1 to image 7 describe the systole phase and image 8 to image 20 describe the diastolic phase. The shape changes in the systole phase are more rapid than in the diastolic phase. As illustrated, the shape of FIGS. 3(a) and 3(b) are similar even through the start points are different. The similarity in shape illustrates the periodic characteristic of heart motion. For example, when one part of the heart is in motion the other parts may be still.

Figure 4A:
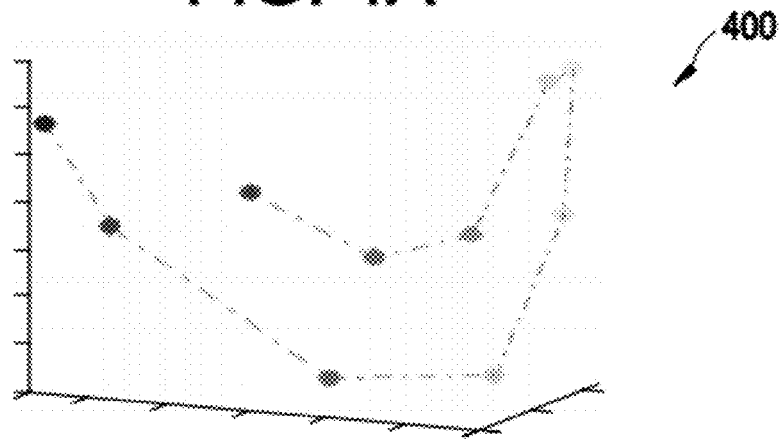
FIG. 4(a) illustrates a graphical representation of a gated CT sequence.
Figure 4B:
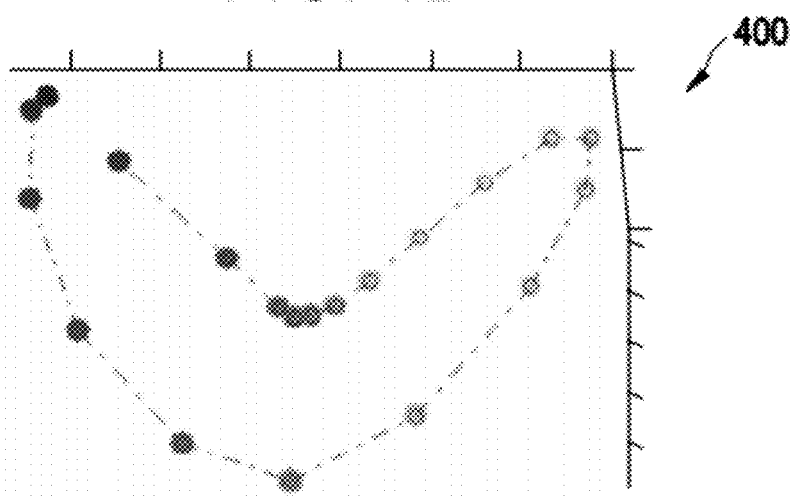
FIG. 4(b) illustrates a graphical representation of a MRI sequence.
Figure 4C:
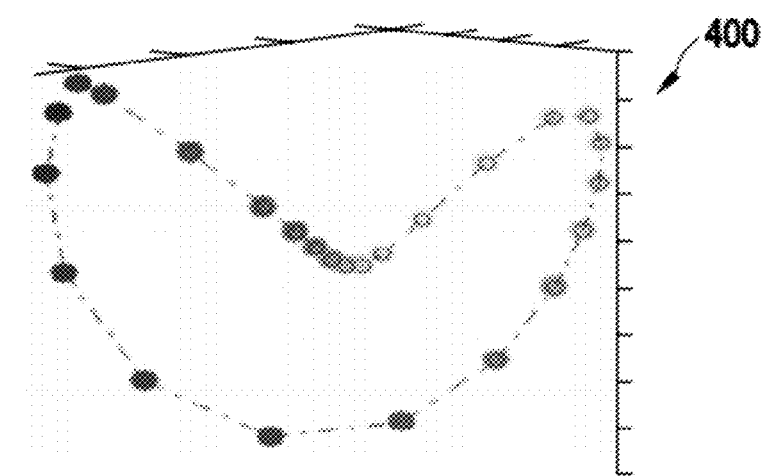
FIG. 4(c) illustrates a graphical representation of a MRI sequence.

FIGS. 4(a), 4(b), and 4(c) illustrate respective graphics 400(a), 400(b), and 400(c) in accordance with an embodiment of the present invention. FIG. 4(a) illustrates a graphical representation of a gated CT sequence having temporal resolution of 10. FIGS. 4(b) and 4(c) represent a graphical representation of MRI sequences having a temporal resolution of 25. The figures 400(a), 400(b), and 400(c) illustrate short axis views of possible graphical representations of that may be used in accordance with an embodiment of the present invention.

The system and method described above may be carried out as part of a computer-readable storage medium including a set of instructions for a computer. The set of instructions may include a locally linear embedding routine for performing a locally linear embedding algorithm on a first set of cardiac image sequences and on a second set of cardiac image sequences. The locally linear embedding algorithm yields a first set of motion patterns corresponding to the first set of cardiac image sequences and a second set of motion patterns corresponding to the second set of cardiac image sequences. The set of instructions also includes a mapping routine for mapping the first set of motion patterns to a first graphical representation and mapping the second set of motion patterns to a second graphical representation. The set of instructions also includes a determining routine for determining whether the first set of cardiac image sequences and the second set of cardiac image sequences were generated from a similar point of view.

If the first set of cardiac image sequences and the second set of cardiac image sequences were generated from a similar point of view, the set of instructions aligns the first graphical representation with the second graphical representation by minimizing the error between at least one point on the first graphical representation and at least one point on the second graphical representation. In an embodiment, the first graphical representation is further aligned with said second graphical representation by rotating the end-diastolic point for the first graphical representation.

If the first set of cardiac image sequences and the second set of cardiac image sequences were not generated from a similar point of view, the set of instructions aligns the first graphical representation with a first template. The first template corresponds to the point of view of the first graphical representation. In an embodiment, the templates correspond to at least one of the following: computerized tomography, magnetic resonance, electron beam tomography, positron emission tomography, or single photon emission computed tomography. The set of instructions also aligns the second graphical representation with a template. The second template corresponds to the point of view of the second graphical representation. The first graphical representation and the second graphical representation may be further aligned by rotating the end-diastolic point for the first graphical representation until the first graphical representation and the second graphical representation are aligned according to a threshold value. The threshold value may be some value indicating the first graphical representation and the second graphical representation are substantially aligned.

In an embodiment, the first set of cardiac image sequences and said second set of cardiac image sequences are acquired from the same modality. Alternatively, the first set of cardiac image sequences and said second set of cardiac image sequences are acquired from different modalities. The first graphical representation may be a short axis or long axis view and the second graphical representation may be a short axis or a long axis view.

The technical effect of the invention is to temporally aligning a plurality of cardiac image sequences. In an embodiment of the present invention, the technical effect may be achieved by performing a locally linear embedding algorithm on a first set of cardiac image sequences and on a second set of cardiac image sequences, wherein the locally linear embedding algorithm yields a first set of motion patterns corresponding to the first set of cardiac image sequences and a second set of motion patterns corresponding to the second set of cardiac image sequences. The first set of motion patterns is mapped to a first graphical representation and the second set of motion patterns is mapped to a second graphical representation.

If the first set of cardiac image sequences has the same point of view as the second set of cardiac image sequences, the first graphical representation is aligned with the second graphical representation by minimizing the error between at least one point on the first graphical representation and at least one point on the second graphical representation. The image sets are then further aligned by rotating the end-diastolic point for the first graphical representation until the first graphical representation and the second graphical representation are aligned according to a threshold value.

If the first set of cardiac image sequences has a different point of view as the second set of cardiac image sequences, the first and second graphical representations are aligned with a template. The image sets are then further aligned by rotating the end-diastolic point for the first graphical representation until the first graphical representation and the second graphical representation are aligned according to a threshold value.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

The invention claimed is:

1. A method for temporally aligning a plurality of cardiac image sequences, said method comprising:
performing a locally linear embedding algorithm on a first set of cardiac image sequences and on a second set of cardiac image sequences, wherein said locally linear embedding algorithm yields a first set of motion patterns corresponding to said first set of cardiac image sequences and a second set of motion patterns corresponding to said second set of cardiac image sequences;
mapping said first set of motion patterns to a first graphical representation and mapping said second set of motion patterns to a second graphical representation;

determining whether the first set of cardiac image sequences and said second set of cardiac image sequences were generated from a similar point of view, wherein the similar point of view is a similar perspective;

wherein if the first set of cardiac image sequences and said second set of cardiac image sequences were generated from a similar point of view, aligning said first graphical representation with said second graphical representation by minimizing the error between at least one point on said first graphical representation and at least one point on said second graphical representation;

wherein if the first set of cardiac image sequences and said second set of cardiac image sequences were not generated from a similar point of view, aligning the first graphical representation with a first template, wherein said first template corresponds to the point of view of the first graphical representation and aligning the second graphical representation with a second template, wherein said second template corresponds to the point of view of the second graphical representation.

2. The method of claim 1, wherein said first set of cardiac image sequences and said second set of cardiac image sequences are acquired from the same modality.

3. The method of claim 1, wherein said first set of cardiac image sequences and said second set of cardiac image sequences are acquired from different modalities.

4. The method of claim 1, wherein if the first set of cardiac image sequences and said second set of cardiac image sequences were generated from a similar point of view, aligning said first graphical representation with said second graphical representation by minimizing the error between at least one point on said first graphical representation and at least one point on said second graphical representation further includes rotating the end-diastolic point for the first graphical representation until the first graphical representation and the second graphical representation are aligned according to a threshold value.

5. The method of claim 1, wherein said first graphical representation is a short axis view.

6. The method of claim 5, wherein said second graphical representation is a short axis view.

7. The method of claim 5, wherein said second graphical representation is a long axis view.

8. The method of claim 1, wherein if the first set of cardiac image sequences and said second set of cardiac image sequences were not generated from a similar point of view, aligning the first graphical representation with a first template, wherein said first template corresponds to the point of view of the first graphical representation and aligning the second graphical representation with a second template, wherein said second template corresponds to the point of view of the second graphical representation further includes rotating the end-diastolic point for the first graphical representation until the first graphical representation and the second graphical representation are aligned according to a threshold value.

9. A computer system for temporally aligning a plurality of cardiac image sequences, the computer system comprising:
a processor;
a memory in communication with said processor, said memory including program code executable by the processor for performing a locally linear embedding algorithm on a first set of cardiac image sequences and on a second set of cardiac image sequences, wherein said locally linear embedding algorithm yields a first set of motion patterns corresponding to said first set of cardiac image sequences and a second set of motion patterns corresponding to said second set of cardiac image sequences, and for mapping said first set of motion patterns to a first graphical representation and mapping said second set of motion patterns to a second graphical representation, and for determining whether the first set of cardiac image sequences and said second set of cardiac image sequences were generated from a similar point of view, wherein the similar point of view is a similar perspective, and wherein if the first set of cardiac image sequences and said second set of cardiac image sequences were generated from a similar point of view, aligning said first graphical representation with said second graphical representation by minimizing the error between at least one point on said first graphical representation and at least one point on said second graphical representation, and wherein if the first set of cardiac image sequences and said second set of cardiac image sequences were not generated from a similar point of view, aligning the first graphical representation with a first template, wherein said first template corresponds to the point of view of the first graphical representation and aligning the second graphical representation with a second template, wherein said second template corresponds to the point of view of the second graphical representation.

10. The system of claim 9, wherein if the first set of cardiac image sequences and said second set of cardiac image sequences were generated from a similar point of view, aligning said first graphical representation with said second graphical representation by minimizing the error between at least one point on said first graphical representation and at least one point on said second graphical representation further includes rotating the end-diastolic point for the first graphical representation until the first graphical representation and the second graphical representation are aligned according to a threshold value.

11. The system of claim 9, wherein if the first set of cardiac image sequences and said second set of cardiac image sequences were not generated from a similar point of view, aligning the first graphical representation with a first template, wherein said first template corresponds to the point of view of the first graphical representation and aligning the second graphical representation with a second template, wherein said second template corresponds to the point of view of the second graphical representation further includes rotating the end-diastolic point for the first graphical representation until the first graphical representation and the second graphical representation are aligned according to a threshold value.

12. The system of claim 9, wherein said first template and said second template correspond to at least one of the following: computerized tomography, magnetic resonance, electron beam tomography, positron emission tomography, or single photon emission computed tomography.

13. A non-transitory computer-readable storage medium including a set of instructions for a computer, the set of instructions comprising:
a locally linear embedding routine for performing a locally linear embedding algorithm on a first set of cardiac image sequences and on a second set of cardiac image sequences, wherein said locally linear embedding algorithm yields a first set of motion patterns corresponding to said first set of cardiac image sequences and a second set of motion patterns corresponding to said second set of cardiac image sequences;

a mapping routine for mapping said first set of motion patterns to a first graphical representation and mapping said second set of motion patterns to a second graphical representation;

a determining routine for determining whether the first set of cardiac image sequences and said second set of cardiac image sequences were generated from a similar point of view, wherein the similar point of view is a similar perspective;

wherein if the first set of cardiac image sequences and said second set of cardiac image sequences were generated from a similar point of view, aligning said first graphical representation with said second graphical representation by minimizing the error between at least one point on said first graphical representation and at least one point on said second graphical representation;

wherein if the first set of cardiac image sequences and said second set of cardiac image sequences were not generated from a similar point of view, aligning the first graphical representation with a first template, wherein said first template corresponds to the point of view of the first graphical representation and aligning the second graphical representation with a template, wherein said second template corresponds to the point of view of the second graphical representation.

14. The set of instructions of claim 13, wherein said first set of cardiac image sequences and said second set of cardiac image sequences are acquired from the same modality.

15. The set of instructions of claim 13, wherein said first set of cardiac image sequences and said second set of cardiac image sequences are acquired from different modalities.

16. The set of instructions of claim 13, wherein if the first set of cardiac image sequences and said second set of cardiac image sequences were generated from a similar point of view, aligning said first graphical representation with said second graphical representation by minimizing the error between at least one point on said first graphical representation and at least one point on said second graphical representation further includes rotating the end-diastolic point for the first graphical representation until the first graphical representation and the second graphical representation are aligned according to a threshold value.

17. The set of instructions of claim 13, wherein said first graphical representation is a short axis view.

18. The set of instructions of claim 17, wherein said second graphical representation is a short axis view.

19. The set of instructions of claim 17, wherein said second graphical representation is a long axis view.

20. The set of instructions of claim 13, wherein if the first set of cardiac image sequences and said second set of cardiac image sequences were not generated from a similar point of view, aligning the first graphical representation with a first template, wherein said first template corresponds to the point of view of the first graphical representation and aligning the second graphical representation with a second template, wherein said second template corresponds to the point of view of the second graphical representation further includes rotating the end-diastolic point for the first graphical representation until the first graphical representation and the second graphical representation are aligned according to a threshold value.

* * * * *